United States Patent [19]

McGaha

[11] 4,114,273

[45] Sep. 19, 1978

[54] HANDPIECE INSTRUMENT CONSOLE APPARATUS HAVING IMPROVED MECHANISMS FOR EXTENDING AND RETRACTING OPERATING FLEXIBLE HOSE

[75] Inventor: George Vernon McGaha, Charlotte, N.C.

[73] Assignee: Pelton & Crane Company, Charlotte, N.C.

[21] Appl. No.: 741,384

[22] Filed: Nov. 12, 1976

[51] Int. Cl.[2] .......... A61C 19/02

[52] U.S. Cl. .......... 32/22; 242/107.6

[58] Field of Search .......... 32/22; 242/107.6

[56] References Cited

U.S. PATENT DOCUMENTS

| | | | |
|---|---|---|---|
| B 367,640 | 1/1975 | Olson | 32/22 |
| 3,180,585 | 4/1965 | Pusey et al. | 32/22 |
| 3,271,859 | 9/1966 | Horowitz et al. | 32/22 |
| 3,488,849 | 1/1970 | Lieb et al. | 32/22 |
| 3,514,171 | 5/1970 | McGaha | 32/22 |
| 3,552,019 | 1/1971 | Crapanzano | 32/22 |
| 3,618,215 | 11/1971 | Hopkins et al. | 32/22 |
| 3,664,024 | 5/1972 | Buchtel et al. | 32/22 |
| 3,722,095 | 3/1973 | Pietchmann | 32/22 |
| 3,872,593 | 3/1975 | Thornton, Jr. et al. | 32/22 |
| 3,912,035 | 10/1975 | Vlert | 242/107.6 |

FOREIGN PATENT DOCUMENTS

| | | | |
|---|---|---|---|
| 1,566,210 | 1/1970 | Fed. Rep. of Germany | 32/22 |

*Primary Examiner*—Russell B. Kinsey
*Assistant Examiner*—John J. Wilson
*Attorney, Agent, or Firm*—Bell, Seltzer, Park & Gibson

[57] ABSTRACT

A dental or medical handpiece instrument console apparatus, including means for holding, extending and retracting operating flexible hose attached to the instruments, for easy use in over-the-patient positions, as follows. A hollow cabinet, a plurality of handpiece instruments and connecting operating flexible hose positioned within the cabinet in generally U-shaped configurations and in horizontal, parallel positions. Improved, selectively actuatable, extending and retracting mechanisms are provided for the flexible hose including a pulley attached to a cable of a rotatable reel which carries a ratchet wheel engageable by a pawl such that the instrument and hose may be pulled to an extended position and the pawl engaged with the ratchet wheel to lock the hose and instrument in its extended position and which will release the ratchet wheel for retraction of the instrument and hose into the console by a bias when non-use of the instrument is desired. There is also provided a selectively actuatable mechanism associated with each of the instruments and hose and which is responsive to movement of the instrument and hose from the retracted position to a desired extending position for allowing the pawl to engage the ratchet wheel if the instrument and hose are released in a desired extended position within a predetermined timed period and which allows release of the pawl from the ratchet upon a slight forward movement of the instrument and hose when it is desired to retract the instrument and hose.

9 Claims, 7 Drawing Figures

FIG-1
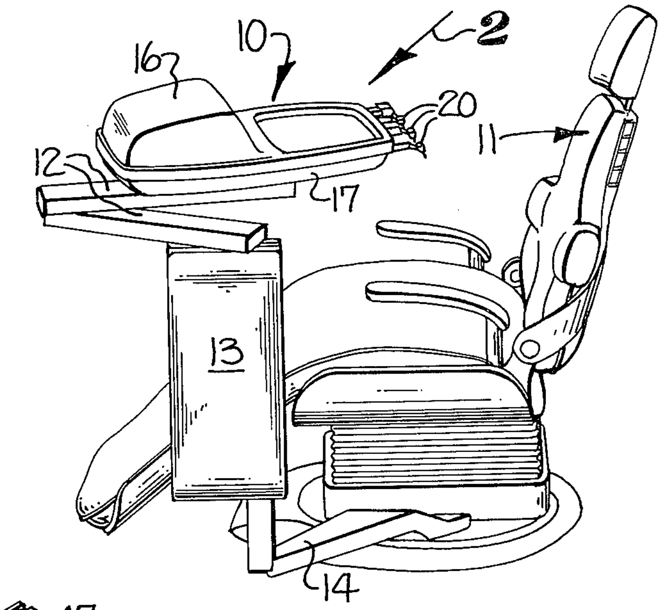
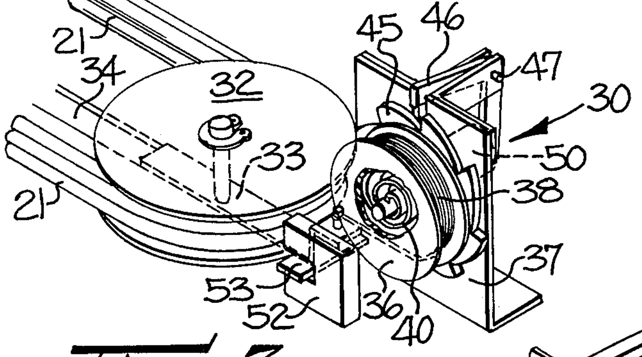
FIG-3
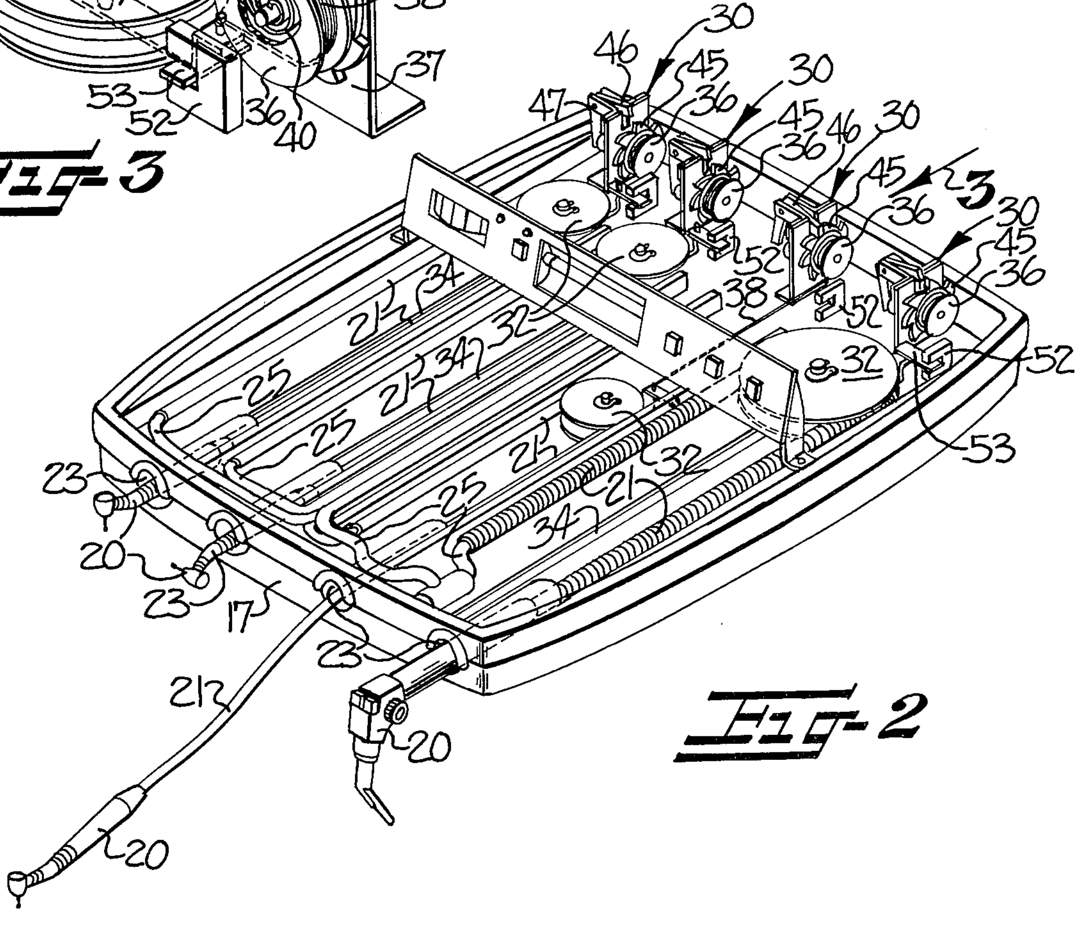
FIG-2

HANDPIECE INSTRUMENT CONSOLE APPARATUS HAVING IMPROVED MECHANISMS FOR EXTENDING AND RETRACTING OPERATING FLEXIBLE HOSE

This invention relates to a dental or medical handpiece instrument console apparatus, characterized by a thin and compact construction for easy use in over-the-patient positions, and an improved extending and retracting mechanism for flexible operating hose attached to such instruments.

BACKGROUND OF THE INVENTION

In dental, medical or other professions, handpiece instruments, such as dental drills, evacuators, surgical instruments, etc., are often utilized by the dentist, physician or other person performing treatment on a patient. These handpiece instruments are operated through elongate, flexible, operating hose which are attached at one end to the instrument and lead from a source of air, water, electrical energy, etc. which are utilized in operating the handpiece instruments.

These handpiece instruments are often positioned in a console apparatus which may be placed beside-the-patient, over-the-patient, or other desired convenient positions for use by the person performing the treatment. The instruments and attached operating hose are pulled from retracted positions in the console apparatus when use thereof is not desired to extended positions out of the console apparatus when use thereof is desired. The usual arrangement of the flexible operating hose within the instrument console is in a vertically and downwardly extending loop which may be shortened upon the pulling of the instrument and its operating hose from the retracted position to the extended positions for use thereof. Such an arrangement is illustrated in prior U.S. Pat. No. 3,514,171, assigned to the assignee of the present invention.

The above-described arrangement is not conducive to providing thin and compact instrument console constructions which may be utilized in over-the-patient positions for convenient access to the user of the instruments for the treatment of a patient positioned in a treatment chair.

Arrangements have been suggested in other mechanisms for positioning of the flexible operating hose connected to handpiece instruments of this type, other than the placing of such operating hose in a downwardly and vertically extending loop, and such mechanisms have suggested or provided devices for holding, extending and retracting the operating flexible hose attached to such instruments. However, these other arrangements and their extending and retracting mechanisms have been overly complicated in their construction and use, have failed to provide a thin and compact construction for an over-the-patient instrument console, and have failed to provide satisfactory holding, extending and retracting mechanisms for the flexible hose which provide easy operation by the user, etc.

OBJECTS AND SUMMARY OF INVENTION

Accordingly, the objects of this invention are to provide an improved dental or medical handpiece console apparatus, which is characterized by a thin and compact construction for easy use in over-the-patient positions, and to provide an improved extending and retracting mechanism for flexible hose attached to such handpiece instrument.

It has been found by this invention that the above objects may be accomplished by providing apparatus, generally as follows.

A hollow cabinet means has a length, width and thickness sufficient for containing a plurality of instruments and flexible hose attached thereto positioned in a unique arrangement for providing a thin and compact construction. A plurality of dental or medical handpiece instruments are positioned during non-use partially within the cabinet means at an open front portion in generally horizontal parallel spaced-apart positions to extend outwardly therefrom and each include a separate operating flexible hose attached thereto at one end thereof. The flexible hose are positioned during non-use within the cabinet in generally U-shaped configurations occupying generally horizontal parallel spaced-apart positions. Each of the flexible hose has generally the other end thereof fixed to the cabinet so that the instruments and flexible hose may be selectively pulled from retracted positions in the cabinet to extended positions when use thereof is desired.

The apparatus further includes selectively operable means associated with each of the instruments and hose and being responsive to movement of the respective instrument and hose from the retracted position to a desired extended position for locking the instrument and hose in the desired extended position and being responsive to a slight further extension of the instrument and hose for releasing the locking thereof and for retracting the instrument and hose to the retracted positions.

The selectively operable means includes a moveable pulley associated with each of the hose for receiving therearound an intermediate portion of the hose and for moving longitudinally forward and rearward to allow extension and retraction of the effective longitudinal length of the hose. Rotatable reel means are associated with each of the pulleys and include cable means wound therearound and having one end thereof fixed to the pulley for unwinding from the reel means by rotation of the reel means in one direction during movement of the instrument and hose to an extended position and for winding on the reel means by rotation of the reel means in the other direction during movement of the instrument and hose to the retracted position. Means are provided for biasing the reel means in the other direction for winding of the cable means thereon and for providing a positive retracting movement for the instrument and hose. Selectively actuatable stop means are connected with the reel means for preventing rotation of the reel means in the other direction under the influence of the biasing means upon movement to and release of the instrument and hose at desired extended positions. The selectively actuatable means is responsive to movement of the apparatus for extending the instrument and hose for operating the stop means to lock the instrument and hose in the desired extended position and is responsive to a slight further extension of the instrument and hose for releasing the stop means to allow retraction of the instrument and hose by the reel means rotating in the other direction under the influence of the biasing means.

The selectively actuatable stop means includes a ratchet and pawl device comprising a ratchet wheel secured to the reel means for rotation therewith and pawl means mounted for pivotal movement by gravity into engagement with the ratchet means for preventing rotation of the ratchet wheel and the reel in the other direction under the influence of the biasing means. The pawl is held in engagement with the ratchet wheel by frictional contact therebetween under the bias of the reel biasing means. A selectively actuatable means is associated with the pawl means for biasing and holding the pawl means against gravity out of engagement with the ratchet wheel when actuated and for allowing the pawl means to move by gravity into engagement with the ratchet wheel when deactuated. This selectively actuatable means is responsive to movement of the apparatus for extending the instrument and hose for deactuation thereof for a predetermined timed period and for actuation thereof after the predetermined timed period.

This selectively actuable means associated with the pawl means preferably include an electrically operated magnetic means for being electrically actuated to magnetically attract, move and hold the pawl means in position out of engagement with the ratchet wheel in the absence of frictional engagement therebetween. An electrical circuit is connected with the magnetic means for supplying electrical energy thereto. Sensing means, preferably in the form of a photoelectric cell device, is provided in the electrical circuit and is responsive to movement of the apparatus for extending the instrument and hose from the retracted position to the extended position for stopping the supply of electrical energy to the magnetic means. A timer means is positioned in the electric circuit and is responsive to the sensing means stopping the supply of electrical energy to the magnetic means for re-establishing the supply of electrical energy to the magnetic means after a predetermined timed period.

In accordance with the above apparatus, the pawl will drop into engagement with the ratchet wheel for a predetermined timed period upon extension of the instrument and hose and will be held by friction in engagement therewith against the bias of the magnetic biasing means if the instrument and hose are released in their desired extended positions during such predetermined timed period for locking of the instrument and hose in their extended positions. The pawl means will be moved out of engagement with the ratchet wheel by the magnetic means for retraction of the instrument and hose after the predetermined timed period upon failure to release the instrument and hose during the predetermined time period or upon a slight extension of the instrument and hose to break the frictional engagement of the pawl means and the ratchet means. This arrangement provides the safety feature that, if the operator of the handpiece instrument changes his mind about use of such instrument during movement of the instrument and hose to an extended position, the instrument and hose will be automatically retracted to its original retracted position upon failure of the operator to release the instrument and hose in a desired extended position during the aforementioned predetermined timed period.

BRIEF DESCRIPTION OF THE DRAWINGS

Some of the objects and advantages of this invention having been stated, other objects and advantages will appear as the description proceeds, when taken in conjunction with the accompanying drawings, in which:

FIG. 1 is a perspective view of the handpiece instrument console apparatus of this invention illustrated in conjunction with a treatment chair;

FIG. 2 is a perspective view of the handpiece instrument console apparatus, taken generally at the arrow 2 in FIG. 1, with the top portion thereof removed for illustration of the instrument and operating hose extending and retracting mechanisms;

FIG. 3 is a partial, perspective view of one of the extending and retracting mechanisms illustrated in FIG. 2 and taken generally at the arrow 3 of FIG. 2;

DESCRIPTION OF PREFERRED EMBODIMENT

Figure 4:
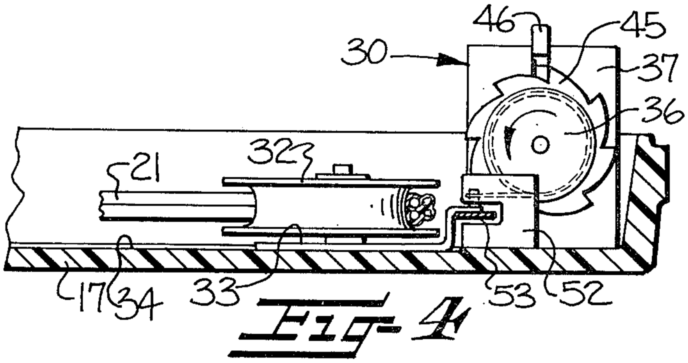
FIG. 4 is a side elevational view, partly in section, of the mechanisms illustrated in FIG. 3.
Figure 5:
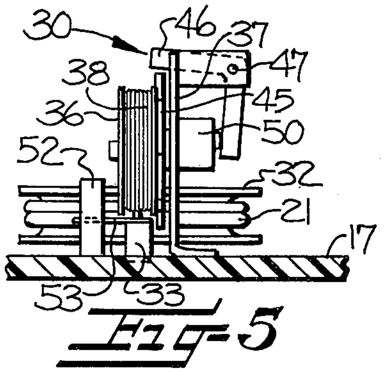
FIG. 5 is a rear elevational view, partly in section, of the mechanisms shown in FIGS. 3 and 4.

Referring now to the drawings, the dental or medical handpiece instrument console apparatus, generally indicated at 10, is illustrated in FIG. 1 as being attached to a treatment chair 11 for movement therewith. However, it is to be understood that this dental or medical handpiece instrument console apparatus may be utilized in any desired environment, with or without a treatment chair 11. The handpiece instrument console 10 may be mounted on pivoting arms 12 which are carried by a cabinet 13 adapted to contain suitable plumbing, valves, electronic circuits, mechanisms for elevating the console 10 and other support apparatus. As illustrated in FIG. 1, the cabinet 13 is carried by a base 14 attached to the base of the treatment chair 11 for swivelling movement therewith.

As illustrated in FIGS. 1 and 2, the handpiece instrument console 10 comprises a hollow cabinet having an upper portion 16 removably secured to a lower portion 17 by any suitable means such as friction interlocking flanges or the like. The hollow cabinet 16, 17 has a length, width and thickness sufficient for containing a plurality of dental or medical handpiece instruments 20 and attached flexible operating hose 21 positioned in an unique arrangement for providing a thin and compact construction.

As shown particularly in FIG. 2, the hollow cabinet or lower portion 17 thereof includes a partially open front end which may comprise open ports 23 for receiving the handpiece instruments 20 and holding the handpiece instruments 20 within the port 23 during non-use so that the handpiece instruments 20 extend partially within the cabinet 16, 17 and extend partially outward of the cabinet 16, 17 for convenient selection by the dentist or other user of the handpiece instruments. The handpiece instruments 20 are thus positioned in generally horizontal, parallel, spaced-apart positions. Each of these handpiece instruments 20, as mentioned above, includes a separate operating flexible hose 21 attached thereto at one end thereof and being positioned during non-use within the cabinet 16, 17 in a generally U-shaped configuration. The hose 21 occupy generally horizontal, parallel spaced-apart positions. The other end of each of the flexible hose 21 is fixed to the cabinet portion 17 at a suitable connection 25 for receiving operating air, water, electrical conduits, etc. which are utilized in operating the handpiece instruments. For example, the lower handpiece instrument 20, as viewed in FIG. 2, is a dental syringe and evacuator for placing in the mouth of a dental patient to evacuate excess water, saliva, debris, etc. and to spray water and/or air and would include a suction conduit and water and air conduits extending through the operating hose 21. The other three handpiece instruments, illustrated in FIG. 2, comprise air driven dental drills in which a conduit for drive air extends through the respective hose 21 attached to these handpiece instruments and also conduits for chip air and coolant water may be provided for these instruments for use in a well known manner through the respective flexible hose 21.

By the above-described arrangement and positioning of the instruments 20 and their operating hose 21, each handpiece instrument 20 and its operating hose 21 may be selectively pulled from retracted positions in which the handpiece instruments 20 are positioned partially within the cabinet 16, 17 to desired extended positions in which the selected instrument 20 and part of its operating hose are pulled from the cabinet 16, 17 for convenient use by the user of the instrument. Both of the above positions are illustrated in FIG. 2. In the extended position of the instrument 20 and its operating hose 21, the effective length of the operating hose 21 is lengthened and the U-shaped portion within the cabinet 16, 17 is shortened.

Also, by the above arrangement and positioning of the instruments 20 and the flexible hose 21, a desirable length, width and thickness may be provided for the console 10 to be utilized as an over-the-patient console, as is illustrated in FIG. 1. If the flexible hose 21 were positioned in other positions, the desirable thin construction could not be obtained, and over-the-patient positioning of the console 10 would be difficult.

Each of the handpiece instruments 20 and its connected operating hose 21 include a selectively operable extending and retracting mechanism, generally indicated at 30, which is responsive to movement of the respective handpiece instrument 20 and connected hose 21 from the retracted position to a desired extended position for locking the instrument 20 and hose 21 in the desired extended position and being responsive to a slight further extension of the instrument 20 and the hose 21 for releasing the locking thereof and for retracting the instrument 20 and hose 21 to the retracted position.

Each of these extending and retracting mechanisms 30 include a moveable pulley 32 positioned for receiving therearound an intermediate portion of the respective flexible hose 21 which is disposed in a generally U-shaped configuration and is being fixedly held at the one end at 25. The pulley 32 is mounted by a bracket 33 in a trackway 34 formed in the lower portion 17 of the cabinet for forward and rearward longitudinal movement with the hose 21 during movement thereof between retracted and extended positions to extend and retract the effective longitudinal length of the flexible hose 21.

The extending and retracting mechanisms further include a rotatable reel 36 rotatably mounted on an upstanding bracket 37 from the lower portion 17 of the cabinet and having a cable 38 wound therearound. The cable 38 has the outer end thereof fixed to the pulley 32 and more particularly to the bracket 33 for unwinding from the reel 36 by rotation of the reel in one direction, e.g. clockwise as viewed in FIG. 3, during extension of the flexible hose 21 and for winding on the reel 36 by rotation of the reel in the other direction, e.g. counter-clockwise as viewed in FIG. 3, during retraction of the flexible hose 21. The reel 36 is biased by a spring 40 in the other direction of rotation thereof for winding of the cable 38 on the reel 36 for providing a positive retracting movement to the hose 21.

The extending and retracting mechanisms 30 further include selectively actuable stop means connected with the reel 36 for preventing rotation of the reel in the other direction under the influence of the biasing spring 40 upon movement to and release of the instrument 20 and hose 21 at desired extended positions. This selectively actuatable means is responsive to movement of the extending and retracting mechanisms for operating the stop means to lock the instrument 20 and hose 21 in the desired extended position and is responsive to a slight further extension of the instrument 20 and hose 21 for releasing the stop means to allow retraction of the instrument 20 and hose 21 by the reel 36 rotating in the other direction under the influence of the biasing spring 40.

This selectively actuatable stop means comprises a ratchet wheel 45 secured to the reel 36 for rotation therewith and a pawl 46 which is pivotally mounted at 47 on a portion of the upstanding bracket 37 and is generally L-shaped for movement by gravity into engagement with the ratchet wheel 45 for preventing rotation of the ratchet wheel 45 and reel 36 in the other direction under influence of the biasing spring 40.

Selectively actuatable means are associated with the pawl 46 for biasing and holding the pawl 46 against gravity out of engagement with the ratchet wheel 45 when actuated, and for allowing the pawl 46 to move by gravity into engagement with the ratchet wheel 45 when deactuated. This selectively actuatable means is responsive to movement of the apparatus for extending the instrument 20 and hose 21 for deactuation thereof for a predetermined timed period and for actuation thereof after the predetermined timed period. By this arrangement, the pawl 46 will drop into engagement with the ratchet wheel 45 for a predetermined timed period upon extension of the instrument 20 and hose 21 and will be held by friction in engagement therewith against the bias of the pawl biasing means, if the instrument and hose are released in their desired extended positions during such predetermined timed period, for locking of the instrument and hose in their extended positions. The pawl 46 will be moved out of engagement with the ratchet wheel 45 by the pawl biasing and holding means for retraction of the instrument 20 and hose 21 after the predetermined timed period upon failure to release the instrument 20 and hose 21 during the predetermined timed period or upon a slight extension of the instrument 20 and hose 21 to break the frictional engagement of the pawl 46 and ratchet wheel 45.

Figure 6:
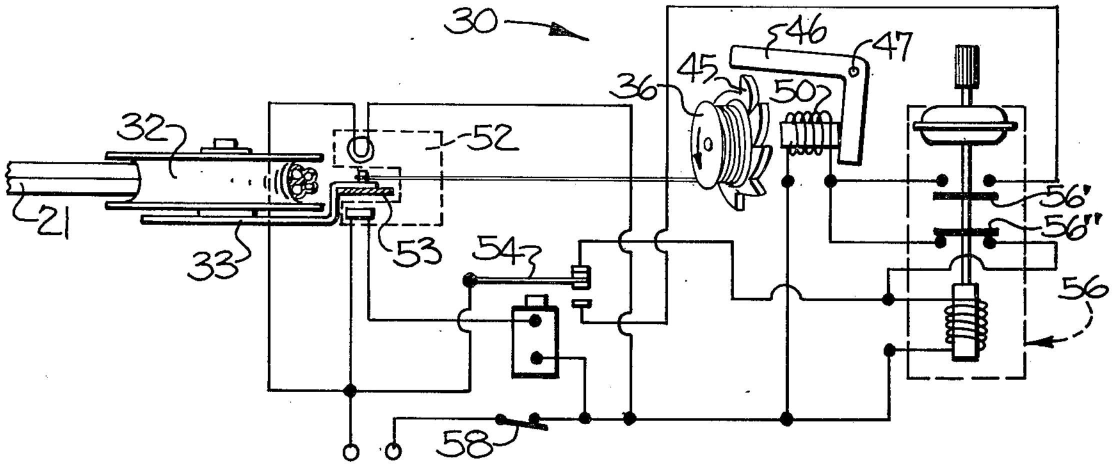
FIG. 6 is a schematic, electrical-mechanical view particularly illustrating the selectively actuatable devices utilized with the operating hose extending and retracting mechanisms and showing such devices in the condition of the instrument and hose in their retracted position.
Figure 7:
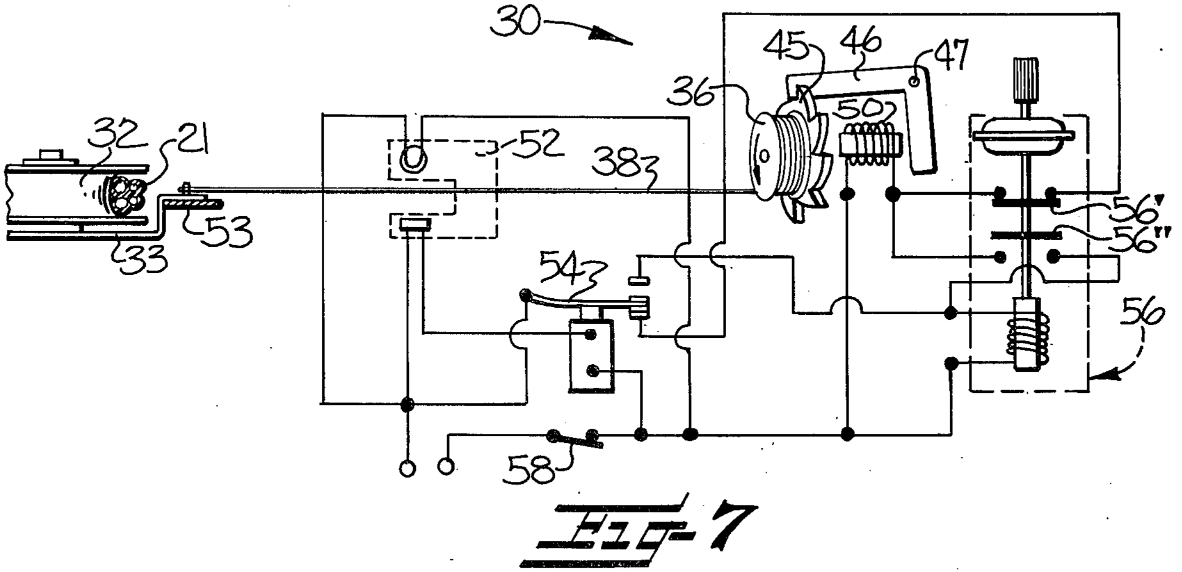
FIG. 7 is a view like FIG. 6 illustrating the devices in the condition thereof in which the instrument and hose are in an extended position.

This selectively actuatable means preferably comprises, as shown more particularly in FIGS. 6 and 7, an electrically operated magnetic means in the form of an electrically actuated magnetic coil 50 for being electrically actuated to magnetically attract, move, and hold the pawl 46 in position out of engagement with the ratchet wheel 45 in the absence of frictional engagement therebetween, as shown in FIG. 6. Thus, the magnetic coil 50 will bias the pawl 6 out of engagement with the ratchet wheel 45 when the magnetic coil 50 is electrically actuated.

This selectively actuatable means further includes an electrical circuit connected with the magnetic coil 50 for supplying electrical energy thereto. A sensing means, preferably in the form of a photoelectric cell device 52, is connected in the circuit and is responsive to movement of the apparatus for extending the instrument 20 and hose 21 from the retracted positions to the extended positions for stopping the supply of electrical energy to the magnetic coil 50.

As illustrated in FIGS. 6 and 7, an arm 53 extends outwardly from the bracket 33 carried by the pulley 32 for being positioned between the photoelectric cell device 52 when the pulley 32, instrument 20 and hose 21 are in their retracted positions. If the dentist or other user of the instrument 20 pulls the instrument 20 and thus its attached operating hose 21 from the retracted position to a desired extended position, the arm 53 will move out of the photoelectric cell device 52 initiating a signal from the photoelectric cell device 52 to a switch 54, which may be in the form of a magnetically attracted reed switch, which breaks the electrical circuit from the source of electrical energy to the magnetic coil 50 as the switch 54 moves from the position shown in FIG. 6 to that shown in FIG. 7. When the electrical circuit to the magnetic coil 50 is broken, the pawl 46 will drop by gravity into engagement with the ratchet wheel 45.

Thus, when the instrument 20 and its attached operating hose 21 have been extended to the desired extended position and released, the ratchet wheel 45 and more particularly a respective tooth thereon, will engage the pawl 46 and be held in frictional engagement therewith by the action of reel biasing spring 40 to prevent rotation of the reel 36 in the other direction of rotation thereof to lock the reel 36 in position and thus the extended instrument 20 and hose 21.

Timer means are also provided in the above-described electric circuit, which as illustrated in FIGS. 6 and 7 is in the form of a conventional timer switch 56 having two sets of switching contacts 56' and 56'' therein. This timer switch is responsive to the photoelectric cell sensing means 52 stopping the supply of electrical energy to the magnetic coil 50 for re-establishing the circuit or the supply of electrical energy to the magnetic coil 50 after a predetermined timed period.

As illustrated in FIGS. 6 and 7, when the pulley 32 has moved from the position illustrated in FIG. 6 to that illustrated in FIG. 7 to move the arm 53 from its position within the photoelectric cell sensing device 52, the switch 54 will be moved from the position illustrated in FIG. 6 to that illustrated in FIG. 7 for breaking the electric circuit to the magnetic coil 50 and deenergize the coil of the switch 56. The timer switch 56, after a predetermined timed period, will then move from the position shown in FIG. 6 to the position shown in FIG. 7 to complete the circuit through the contacts 56' to the magnetic coil 50. A preset time lag may be adjustably set into the timer switch 56 and during this time lag, no electrical energy will be supplied to the magnetic coil 50. In the case of the present apparatus, this predetermined timed period or time lag may be set at approximately 1.7 seconds.

During the above-described predetermined timed period or time lag, the magnetic coil 50 will be deenergized and the pawl 46 will drop into engagement with the ratchet wheel 45. However, if the user of the handpiece instrument 20 has not released the instrument 20 and its hose 21 in a desired extended position to establish frictional engagement between the ratchet wheel 45 and the pawl 46, the magnetic coil 50 will be reenergized after the predetermined timed period and the pawl 46 will be pulled out of engagement with the ratchet wheel 45 and the hose 21 and instrument 20 will be retracted by the reel biasing spring 40. However, if the user of the instrument 20 has released the instrument 20 and its hose 21 in a desired extended position during such predetermined timed period, the pawl 46 will be held in engagement with a tooth of the ratchet wheel 45 by frictional engagement through the bias of the reel biasing spring 40. Actuation of the magnetic coil 50 after the predetermined timed period or time lag cannot break this frictional engagement between the pawl 46 and the ratchet wheel 45 until such time as the user of the instrument 20 exerts a slight forward movement on the instrument 20 and hose 21 to break the frictional engagement and allow the magnetic attraction of the magnetic coil 50 to move the pawl 46 out of engagement with the ratchet wheel 45.

The above-described electrical circuit also includes a manually operated switch 58 in the circuit for being opened and closed to activate or deactivate the entire circuit. This switch would be utilized by a dentist or other user of the handpiece instruments 20 to close the switch 58 during hours of operation of the console apparatus and during periods of non-use, such as at night, the dentist could open the switch 58 to shut off the circuit and allow the pawl 46 to drop into engagement with the ratchet wheel 45 to provide a safety lock in the system.

The above described electrical circuit is illustrated and described herein in simplified form for purposes of describing the components thereof which may be utilized for controlling the improved extending and retracting mechanism of this invention. A complete description of an electronic control circuit for controlling inter alia, the improved extending and retracting mechanisms of this invention is fully described in application Ser. No. 741,385, filed concurrently herewith, and assigned to the assignee of the present invention.

Thus, this invention has provided an improved dental or medical handpiece instrument console apparatus which is characterized by a thin and compact construction for easy use in over-the-patient positions. The invention has further provided an improved extending and retracting mechanism for flexible operating hose attached to such instrument. While it is desirable to utilize the improved extending and retracting mechanisms in the improved console apparatus, these mechanisms and apparatus would also have separate utility.

In the drawings and specification, there has been set forth a preferred embodiment of the invention and, although specific terms are employed, they are used in a generic and descriptive sense only.

What is claimed is:

1. A dental or medical handpiece instrument console apparatus, characterized by a thin and compact construction including means for holding, extending and retracting operating flexible hose attached to the instruments, for easy use in over-the-patient positions, said apparatus comprising:

a hollow cabinet means having a length, width and thickness sufficient for containing a plurality of instruments and flexible hose attached thereto and having a partially open front portion;

a plurality of dental or medical handpiece instruments positioned during non-use partially within said cabinet means at said open front portion in generally horizontal parallel spaced-apart positions to extend outwardly therefrom and including a separate operating flexible hose attached to each of said instruments at one end thereof and being positioned during non-use within said cabinet in generally U-shaped configurations occupying generally horizontal parallel spaced-apart positions and having generally the other end thereof fixed to said cabinet means so that said instruments and flexible hose may be selectively pulled from retracted positions in said cabinet means to extended positions when use thereof is desired;

moveable pulley means associated with each of said hose for receiving therearound an intermediate portion of said hose and for moving longitudinaly forward and rearward to allow extension and retraction of the effective longitudinal length of said hose;

rotatable reel means associated with each of said pulley means and including cable means wound therearound and having one end thereof fixed to said pulley means for unwinding from said reel means by rotation of said reel means in one direction during movement of said instrument and hose to an extended position and for winding on said reel means by rotation of said reel means in the other direction during movement of said instrument and hose to the retracted position, and means biasing said reel means in the other direction for winding of said cable means thereon;

ratchet and pawl means comprising a ratchet wheel secured to said reel means for rotation therewith and pawl means mounted for pivotal movement by gravity into engagement with said ratchet means for preventing rotation of said ratchet wheel and said reel in the other direction under the influence of said biasing means, said pawl means being held in engagement with said ratchet wheel by frictional contact therebetween under the bias of said reel biasing means; and selectively actuatable means associated with said pawl means for biasing and holding said pawl means against gravity out of engagement with said ratchet wheel when actuated and for allowing said pawl means to move by gravity into engagement with said ratchet wheel when deactuated, said selectively actuatable means being responsive to movement of said instrument and hose to an extended position for deactuation thereof for a predetermined timed period and for actuation thereof after the predetermined timed period;

whereby, said pawl means will drop into engagement with said ratchet wheel for a predetermined timed period upon movement of said instrument and said hose to an extended position and will be held by friction in engagement therewith aganist the bias of said pawl biasing means if said instrument and hose are relaesed in their desired extended positions during such predetermined timed period for locking of said instrument and hose in their extended positions and said pawl means will be moved out of engagement with said ratchet wheel by said pawl biasing and holding means for retraction of said instrument and hose after the predetermined timed period upon failure to release said instrument and hose during the predetermined timed period or upon a slight extension of said instrument and hose to break the frictional engagement of said pawl means and said ratchet wheel.

2. A dental or medical handpiece instrument console apparatus as set forth in claim 1, in which said selectively actuatable means comprises an electrically operated magnetic means for being electrically actuated to magnetically attract, move and hold said pawl means in position out of engagement with said ratchet wheel in the absence of frictional engagement therebetween, an electrical circuit connected with said magnetic means for supplying electrical energy thereto, sensing means in said electric circuit responsive to movement of said instrument and hose from the retracted positions to the extended positions for stopping the supply of electrical energy to said magnetic means, and timer means in said electric circuit responsive to said sensing means stopping the supply of electrical energy to said magnetic means for re-establishing the supply of electrical energy to said magnetic means after a predetermined timed period.

3. Extending and retracting mechanisms for flexible hose, such as connected to dental or medical treatment instruments, comprising:

rotatable reel means operatively connected to the flexible hose and mounted for rotation in one direction for extension of the flexible hose and for rotation in the other direction of retraction of the flexible hose and including means biasing said reel means in the other direction for providing a positive retracting movement to the flexible hose;

ratchet and pawl means comprising a ratchet wheel secured to said reel means for rotation therewith and pawl means mounted for pivotal movement by gravity into engagement with said ratchet wheel for preventing rotation of said ratchet wheel and said reel in the other direction under the influence of said biasing means, said pawl means being held in engagement with said ratchet wheel by frictional contact therebetween under the bias of said reel biasing means; and selectively actuatable means associated with said pawl means for biasing and holding said pawl means against gravity out of engagement with said ratchet wheel when actuated and for allowing said pawl means to move by gravity into engagement with said ratchet wheel when deactuated, said selectively actuatable means being responsive to movement of said extending and retracting mechanisms in the hose extending direction for deactuation thereof for a predetermined timed period and for actuation thereof after the predetermined timed period;

whereby, said pawl means will drop into engagement with said ratchet wheel for a predetermined timed period upon extension of the hose and will be held by friction in engagement therewith against the bias of said pawl biasing means if the hose is released in its desired extended position during such predetermined timed period for locking of the hose in its extended position and said pawl means will be moved out of engagement with said ratchet wheel by said pawl biasing and holding means for retraction of the hose after the predetermined timed period upon failure to release the hose during the predetermined timed period or upon a slight extension of the hose to break the frictional engagement of said pawl means and said ratchet wheel.

4. Extending and retracting mechanism, as set forth in claim 3, in which said selectively actuatable means comprises an electrically operated magnetic means for being electrically actuated to magnetically attract, move and hold said pawl means in position out of engagement with said ratchet wheel in the absence of frictional engagement therebetween, an electrical circuit connected with said magnetic means for supplying electrical energy thereto, sensing means in said electric circuit responsive to movement of said extending and retracting mechanisms from hose retracted positions to hose extended positions for stopping the supply of electrical energy to said magnetic means, and timer switch means in said electric circuit responsive to said first switch means stopping the supply of electrical energy to said magnetic means for re-establishing the supply of electrical energy to said magnetic means after a predetermined timed period.

5. Extending and retracting mechanisms for flexible hose, such as connected to dental or medical treatment instruments, comprising:

moveable pulley means for receiving therearound an intermediate portion of the flexible hose which is disposed in a generally U-shaped configuration and is being fixedly held at one end thereof and for moving longitudinally forward and rearward to extend and retract the effective longitudinal length of the flexible hose;

rotatable reel means including cable means wound therearound and having one end thereof fixed to said pulley means for unwinding from said reel means by rotation of said reel means in one direction during extension of the flexible hose and for winding on said reel means by rotation of said reel means in the other direction during retraction of the flexible hose, and means biasing said reel means in the other direction for winding of said cable means thereon;

ratchet and pawl means comprising a ratchet wheel secured to said reel means for rotation therewith and pawl means mounted for pivotal movement by gravity into engagement with said ratchet means for preventing rotation of said ratchet wheel and said reel in the other direction under the influence of said biasing means, said pawl means being held in engagement with said ratchet wheel by frictional contact therebetween under the bias of said reel biasing means; and selectively actuatable means associated with said pawl means for biasing and holding said pawl means against gravity out of engagement with said ratchet wheel when actuated and for allowing said pawl means to move by gravity into engagement with said ratchet wheel when deactuated, said selectively actuatable means being responsive to movement of said extending and retracting mechanisms in the hose extending direction for deactuation thereof for a predetermined timed period and for actuation thereof after the predetermined timed period;

whereby, said pawl means will drop into engagement with said ratchet wheel for a predetermined timed period upon extension of the hose and will be held by friction in engagement therewith against the bias of said pawl biasing means if the hose is released in its desired extended position during such predetermined timed period for locking of the hose in its extended position and said pawl means will be moved out of engagement with said ratchet wheel by said pawl biasing and holding means for retraction of the hose after the predetermined timed period upon failure to release the hose during the predetermined timed period or upon a slight extension of the hose to break the frictional engagement of said pawl means and said ratchet wheel.

6. Extending and retracting mechanism, as set forth in claim 5, in which said selectively actuatable means comprises an electrically operated magnetic means for being electrically actuated to magnetically attract, move and hold said pawl means in position out of engagement with said ratchet wheel in the absence of frictional engagement therebetween, an electrical circuit connected with said magnetic means for supplying electrical energy thereto, sensing means in said electric circuit responsive to movement of said extending and retracting mechanisms from hose retracted positions to hose extended positions for stopping the supply of electrical energy to said magnetic means, and timer means in said electric circuit responsive to said sensing means stopping the supply of electrical energy to said magnetic means for re-establishing the supply of electrical energy to said magnetic means after a predetermined timed period.

7. Extending and retracting mechanisms, as set forth in claim 6, in which said sensing means comprises a photoelectric switch means positioned for sensing and responding to forward movement of said pulley means.

8. Stop devices, such as for use with extending and retracting mechanisms for flexible hose connected to dental or medical treatment instruments, comprising:

ratchet wheel means mounted for rotation in one direction, for example upon extension of the flexible hose, and for rotation in the other direction, for example upon retraction of the flexible hose;

means biasing said ratchet wheel for rotation in the other direction;

pawl means mounted for pivotal movement by gravity into engagement with said ratchet wheel means for preventing rotation of said ratchet wheel means in the other direction under the influence of said biasing means, said pawl means being held in engagement with said ratchet wheel means by frictional contact therebetween under the bias of said ratchet wheel biasing means; and selectively actuatable means associated with said pawl means for biasing and holding said pawl means against gravity out of engagement with said ratchet wheel when actuated and for allowing said pawl means to move by gravity into engagement with said ratchet wheel when deactuated, said selectively actuatable means being responsive to rotation of said ratchet wheel in the one direction for a predetermined timed period for deactuation therof for a predetermined timed period and for actuation thereof after the predetermined timed period;

whereby, said pawl means will drop into engagement with said ratchet wheel for a predetermined timed period upon rotation of said ratchet wheel in the one direction and will be held by friction in engagement therewith against the bias of said pawl biasing means if rotation of the ratchet wheel in the one direction is relased during such predetermined timed period, such as for example to lock the flexible hose in a desired extended position upon release of the hose in a desired extended position, and said pawl means will be moved out of engagement with said ratchet wheel means by said pawl biasing and holding means upon failure to release rotation of said ratchet wheel means in the one direction during the predetermined timed period or upon a slight movement of said ratchet wheel means in the one direction to break the frictional engagement of said pawl means and said ratchet wheel means, such as for example to allow retraction of the flexible hose.

9. Stop devices, as set forth in claim 8, in which said selectively actuatable means comprises an electrically operated magnetic means for being electrically actuated to magnetically attract, move and hold said pawl means in position out of engagement with said ratchet wheel in the absence of frictional engagement therebetween, an electrical circuit connected with said magnetic means for supplying electrical energy thereto, sensing means in said electric circuit responsive to movement of said ratchet wheel means in the one direction for stopping the supply of electrical energy to said magnetic means, and timer means in said electrical circuit responsive to said sensing means stopping the supply of electrical energy to said magnetic means for re-establishing the supply of electrical energy to said magnetic means after a predetermined timed period.

* * * * *

UNITED STATES PATENT AND TRADEMARK OFFICE
CERTIFICATE OF CORRECTION

PATENT NO. : 4,114,273

DATED : September 19, 1978

INVENTOR(S) : George Vernon McGaha

It is certified that error appears in the above-identified patent and that said Letters Patent are hereby corrected as shown below:

In the Abstract, 8th line from the bottom, change "extending" to --extended--; Column 1, Line 48, insert --the-- before "positioning"; Column 6, Line 66, change "6" to --46--; Column 10, Line 29, before "retraction", change "of" to --for--.

Signed and Sealed this

*Sixth* Day of *February 1979*

[SEAL]

*Attest:*

RUTH C. MASON
*Attesting Officer*

DONALD W. BANNER
*Commissioner of Patents and Trademarks*